(No Model.) 2 Sheets—Sheet 1.
J. R. CONKLIN.
CORN HARVESTING MACHINE.
No. 423,469. Patented Mar. 18, 1890.
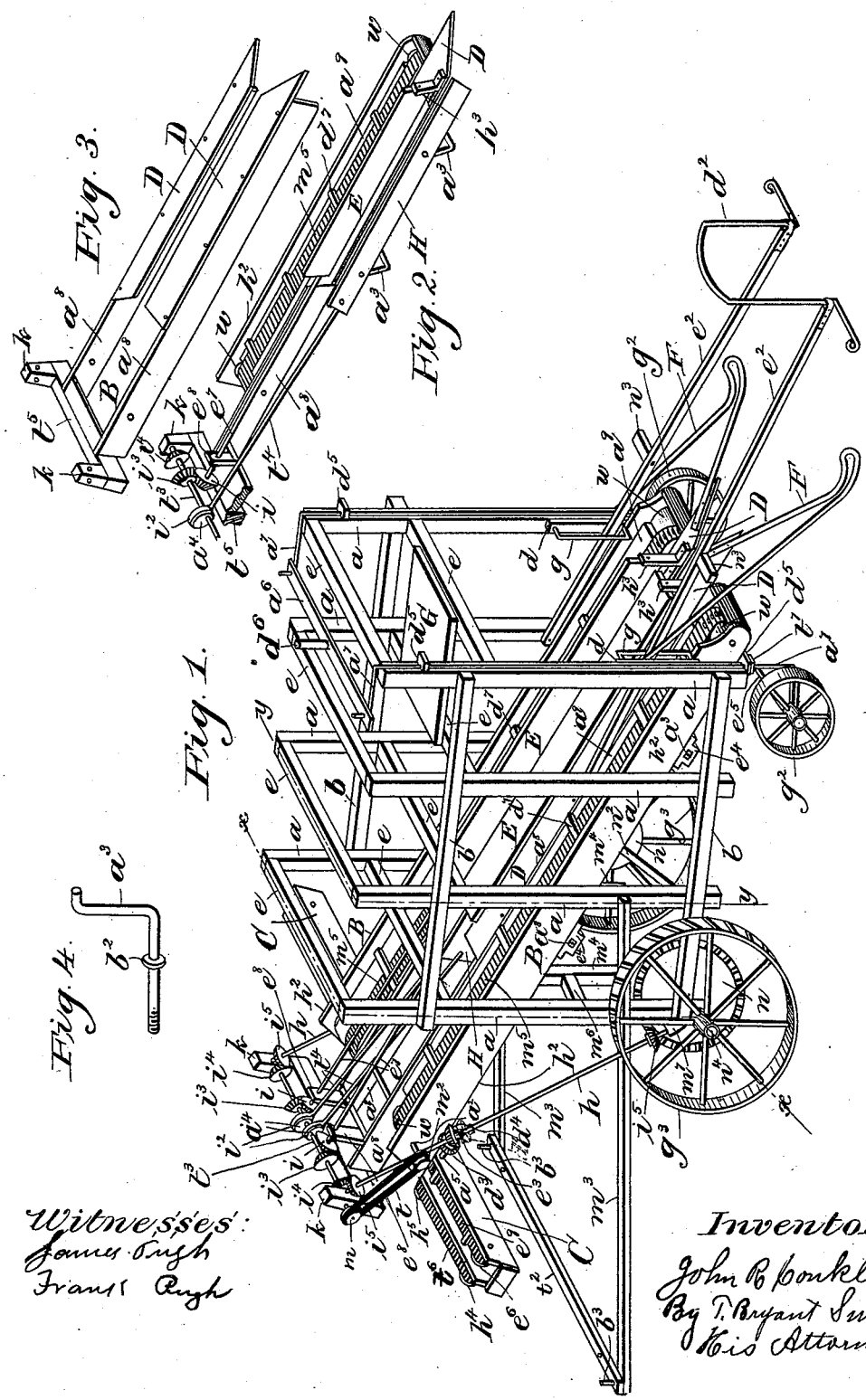
Witnesses:
James Pugh
Frank Pugh
Inventor.
John R. Conklin
By T. Bryant Swan
His Attorney (No Model.) 2 Sheets—Sheet 2.

J. R. CONKLIN.
CORN HARVESTING MACHINE.

No. 423,469. Patented Mar. 18, 1890.

Witnesses:

Inventor:
John R. Conklin
By T. Bryant Swan
His Attorney.

UNITED STATES PATENT OFFICE.

JOHN R. CONKLIN, OF WRIGHT, POTTAWATTAMIE COUNTY, IOWA.

CORN-HARVESTING MACHINE.

SPECIFICATION forming part of Letters Patent No. 423,469, dated March 18, 1890.

Application filed February 11, 1889. Serial No. 299,553. (No model.)

*To all whom it may concern:*

Be it known that I, JOHN R. CONKLIN, a citizen of the United States, residing at Wright township, in the county of Pottawattamie and State of Iowa, have invented a new and useful Corn-Harvesting Machine, of which the following is a specification.

My invention relates to improvements in that class of corn-harvesting machines which snap, break, or strip the ears unhusked from the stalks.

The objects of my improvements are to provide a machine that, when drawn or propelled by horses or other power over and along a row of unharvested corn, will rapidly snap, break, or strip the ears of corn from the stalks and convey the same into a wagon which is drawn and kept beside the machine; also, a machine that will leave the stalks standing as straight after it has taken the ears from them as they stood before; also, a machine that will take up stalks that are down and strip and break the ears from them. I attain these objects by the mechanism illustrated in the accompanying drawings, in which—

Figure 5:
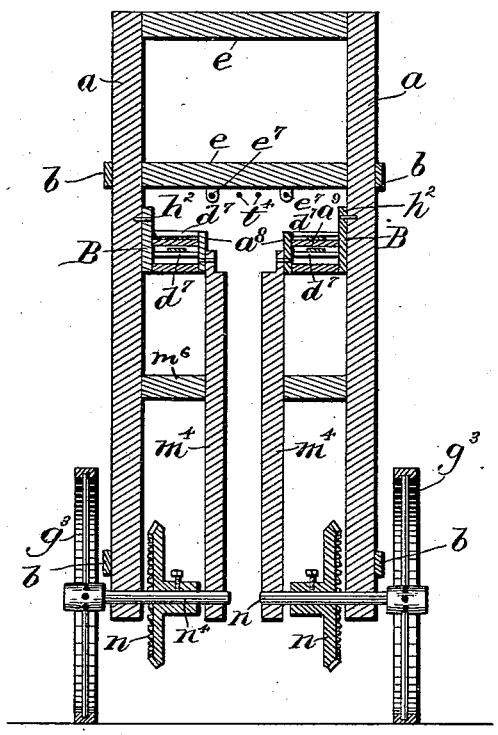
Figure 6:
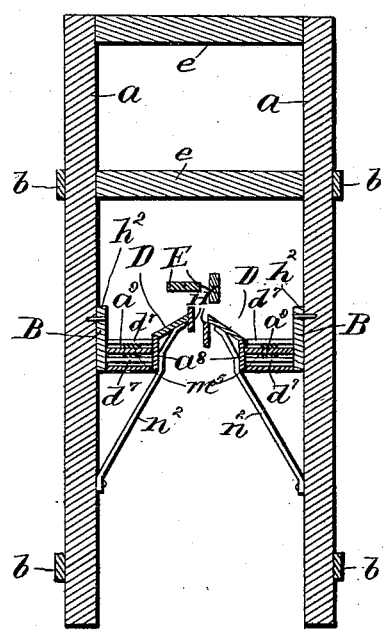
Figure 7:
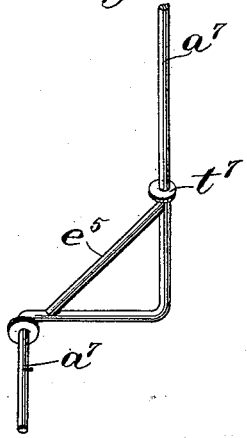

Figure 1 is a perspective view of the machine. Fig. 2 is a detail perspective view of one of the elevators, one of the strippers, one of the beaters, and one of the vibrating bars. Fig. 3 is a detail perspective view of the strippers and of the sides of the elevators, to which they are secured, and of the cross-bar that is secured to the rear ends of the sides of the elevators. Fig. 4 is a detail perspective view of one of the vibrating-bar supports. Fig. 5 is a vertical cross-sectional view of the machine on the line $x\ x$ of Fig. 1. Fig. 6 is a vertical cross-sectional view of the machine on the line $y\ y$ of Fig. 1. Fig. 7 is a detail perspective view of the lower portion of the rod $a^7$.

Similar letters refer to similar parts throughout the several views.

The eight uprights $a$, the two uprights $m^4$, the eight cross-bars $e$, four longitudinal timbers $b$, and two cross-bars $m^6$ constitute the frame of the machine.

The frames of the two elevators B are firmly secured to the sides of the frame, and the elevators are each composed of a bottom and the sides $h^2$ and $a^8$, the longitudinal floor $a^9$, the sprocket-wheels $w\ w$, and the endless sprocket-chain $m^5$, having cross-lugs $d^7$ secured to it.

D D are strippers. They rest upon and are firmly secured by means of screws to the tops of the sides $a^8$ of the elevators, their lower edges being beveled to fit the top of the sides $a^8$. They slant toward each other, and the space between their upper edges is of sufficient size to permit cornstalks to pass through, but not large enough to admit ears of corn. Their forward ends are made angular-shaped, and the forward portions of them are nearer the ground than the ears of corn upon the stalks, and their rear portions are farther from the ground than the ears upon the stalks.

F F are gatherers. They are firmly secured to the forward ends of the strippers and to the front uprights $a\ a$. Their forward ends nearly touch the ground, and are wide enough apart to readily straddle a hill of corn. They are the widest apart at their forward ends.

E E are revolving beaters. They are journaled at their forward ends to the supports $h^3\ h^3$, which are secured to the strippers, and they are situated a sufficient distance from the strippers to permit an ear of corn to pass between the strippers and beaters when the beaters are revolving. The rods $e^7\ e^7$ are firmly secured to the rear ends of the beaters and pass loosely through apertures in the supports $e^8\ e^8$. They have firmly secured to their rear ends the gear-wheels $i\ i$, which engage and form a bevel-gearing with the wheels $i^3\ i^3$, which are carried upon the shaft $t^3$.

H is a vibrating bar. There are two of them, one beside each stripper. They are supported by the crank-shaped supporters $a^3$, which are pivoted at their upper ends to the bars and at their lower portions by means of the lugs $e^4$ to the elevators. The supporters $a^3$ have ledges $b^3$, which rest against the inward side of the lugs $e^4$ and have their lower ends threaded to receive a nut. The rods $t^4\ t^4$ are pivoted at their forward ends to the bars H, and have secured at their rear ends the bands or straps $i^2\ i^2$, which encircle the eccentrics $a^4$ $a^4$, which are carried upon the shaft $t^3$. The axles $n^4$ of the wheels $g^3\ g^3$ pass loosely through apertures in the lower ends of the rear uprights $a\ a$ and in the lower ends of the uprights $m^4\ m^4$, and they are revolved by the wheels $g^3\ g^3$ when the wheels $g^3\ g^3$ are moved forward upon the ground by the forward movement of the harvesting-machine.

The gear-wheels $n\ n$ are firmly secured to the axles of the wheels $g^3\ g^3$. The rods or shafts $h\ h$ are journaled at their upper ends to the supports $k\ k$, and at their lower ends to lugs $m^7$, that are secured to the rear uprights $a\ a$. They have secured to them near their ends gear-wheels $i^5$. The wheels at their lower ends engage with and form a bevel-gearing with the wheels $n\ n$, and those at their upper ends engage and form a bevel-gearing with the wheels $i^4\ i^4$, that are secured to the shaft $t^3$. The sprocket-wheel $m$ is secured to the end of the shaft $t^3$, and is connected by the sprocket-chain $t$ with the sprocket-wheel $m^2$, that is secured to the end of the shaft $a^2$. The shaft $a^2$ has firmly secured to it the sprocket-wheels $w\ w$.

The cross-bar $t^5$ is firmly secured to the rear ends of the sides $a^8\ a^8$ of the elevators. The poles $e^2\ e^2$ are pivoted at their rear ends to the uprights $a\ a$, and have firmly secured to their forward ends the arched neck-yoke $d^2$. The blocks $d\ d$ are secured to the forward uprights $a\ a$, and have firmly secured to them the loops $g\ g$, which, with the blocks, form slots through which the poles $e^2\ e^2$ pass. The poles $m^3\ m^3$ are firmly secured to the frame of the machine, and are provided at their rear ends with the pins $b^3\ b^3$, which pass loosely through apertures in the ends of the cross-bar $t^2$.

C is a carrier constructed mainly like the elevators. It is firmly secured to the under part of the elevators in such a position that the ears of corn will fall from the rear ends of the elevators into it. The carrier has two shafts $a^5$ passing through it, each shaft having secured to its end nearest the rods $h\ h$ a gear-wheel $d^3$, and each shaft has secured to its other end a sprocket-wheel $h^5$. The carrier has in each end sprocket-wheels $e^6$, and each shaft upon which they are carried has secured to its end a sprocket-wheel $h^4$, the sprocket-wheels $h^4$ and $h^5$ being connected by the sprocket-chain $t^6$. The rods $h\ h$ have each secured to them a gear-wheel $d^4$, which engages and forms a bevel-gearing with the wheel $d^3$; but both the wheels $d^4$ are not permitted to engage at the same time with the wheels $d^3$. When one is engaged the other is disengaged. The disengagement is accomplished by means of turning the set-screw $e^3$ and letting the wheel $d^4$ slide down upon the rod $h$. The corn that falls into the carrier can be discharged from either end of the carrier, as may be desired, by engaging and disengaging the wheels $d^4$ with the wheels $d^3$. The rods $a^7\ a^7$ pass loosely through apertures in the lugs $d^5$, there being two lugs $d^5$ secured to each of the forward uprights $a\ a$. The upper portion of the rods are crank-shaped, and their upper ends pass loosely through apertures in the ends of the connecting-bar $a^6$. They have ledges $t^7$, upon which the lower lugs $d^5$ rest. Their lower portions are bent and pass through the hubs of the wheels $g^2\ g^2$ and serve as axles for the wheels. The rods have ledges, forming shoulders, against which the inward ends of the hubs rest. The lower parts of the rods are strengthened by the braces $e^5$, which are secured at both of their ends to the rods $a^7$. The brace $n^2$ is secured to the upright $a$, to the bottom of the elevator, and to the under side of the stripper. By using several of these braces the strippers can be more securely held in position. $n^3\ n^3$ are arms that are secured to the poles $e^2\ e^2$.

When the shaft $t^3$ is revolved, the bars H are caused, by means of the eccentrics, the connecting-rods $t^4$, and the pivoted supports $a^3$, to move up and down between the strippers to such an extent that when the bars are the highest their upper edges project beyond the top edges of the strippers and when they are down the lowest their top edges are below the top edges of the strippers. The eccentrics $a^4\ a^4$ are secured in such a manner to the shaft $t^3$ that they cause one of the bars H to project above the upper edges of the strippers, while the other bar is below the upper edges of the strippers. The shaft $t^3$ is journaled to the supports $k\ k$.

The machine is usually drawn by horses that are attached to whiffletrees which are secured to the ends of the arms $n^3\ n^3$; but when the cornstalks are bent down upon the ground the poles $e^2\ e^2$ are removed and the machine is pushed by placing horses between the poles $m^3\ m^3$ and attaching them to whiffletrees which are secured to the cross-bar $t^2$.

When the machine is pushed, it is steered by a man who stands upon the platform G, and by pushing and pulling the handle $d^6$, that is secured to the bar $a^6$, he can move the wheels $g^2\ g^2$ so as to guide the machine in any desired direction. When the cornstalks are down upon the ground, the gatherers pass under them and lift them up.

The machine is operated by moving it forward over a row of corn in such a position that the gatherers straddle the hills of corn in the row, and as the machine moves forward the cornstalks are guided by the gatherers into the space between the upper edges of the strippers and the ears of corn are brought in contact with the strippers, beaters, and vibrating bars, and are by them stripped and broken from the stalks. When the ears are separated from the stalks, they fall into the elevators, and are by them conveyed to the carrier and by the carrier deposited in a wagon-box, which is kept, by being drawn by horses, under that end of the carrier from which the corn is being discharged.

When the machine is drawn, the cross-bar $t^2$ is removed from the poles $m^3\ m^3$.

Having described my invention, what I claim as new, and desire to secure by Letters Patent, is—

1. The combination, in a corn-harvesting machine, of the elevators supported by a frame mounted upon wheels, with the strippers D D, which are so constructed that they incline downward and outward from their adjacent edges toward and to the elevators, so that the ears of the corn, when stripped from the stalks by the adjacent edges of the strippers, will fall into the elevators located below the adjacent edges of the strippers, substantially as described.

2. In a corn-harvesting machine, the combination of the elevators secured to a frame mounted upon wheels, the strippers, which are so constructed that they incline downward and outward from their adjacent edges toward and to the elevators, the beaters, which extend longitudinally along and above the strippers, and the means for revolving the beaters, substantially as described.

3. The combination, in a corn-harvesting machine, of the strippers secured to a frame mounted upon wheels, the revolving beaters, which extend longitudinally along and above the strippers, and the vibrating bars, which extend along the strippers and move upward and downward between the adjacent edges of the strippers, substantially as described.

4. The combination of the elevators secured to a frame mounted upon wheels, the strippers secured to the frames of the elevators, the revolving beaters, which extend along the adjacent edges of the strippers, the vibrating bars, which extend along the strippers and vibrate between the adjacent edges of the strippers, and the means for actuating the elevators, beaters, and vibrating bars, substantially as set forth.

5. The elevators secured to a frame mounted upon wheels, the strippers, which extend along the inner sides of the elevator-frames, the revolving beaters, which extend along the adjacent edges of the strippers, the carrier secured to the rear ends of the frames of the elevators, and the means for actuating the elevators, beaters, and carrier, substantially as described.

6. In a corn-harvesting machine, the combination of the strippers secured to a frame mounted upon wheels, with the vibrating bars, which extend longitudinally along the strippers and alternately move upward and downward between the adjacent edges of the strippers, substantially as described.

7. A corn-harvesting machine consisting of the elevators secured to a frame mounted upon wheels, the strippers secured to the frames of the elevators, the beaters, which extend longitudinally along the strippers, the vibrating bars, which extend along the strippers and vibrate between the adjacent edges of the strippers, the gatherers, which project outward and downward from the forward ends of the strippers, the carrier secured to the rear ends of the frames of the elevators, and the means, substantially as described, for actuating the elevators, carrier, vibrating bars, and beaters, all combined substantially as described.

JOHN R. CONKLIN.

Witnesses:
  ISAAC SPIKER,
  JAMES MCGINNEY.